J. D. OTSTOT.
Driving Chain and Pulley.
No. 201,698. Patented March 26, 1878.
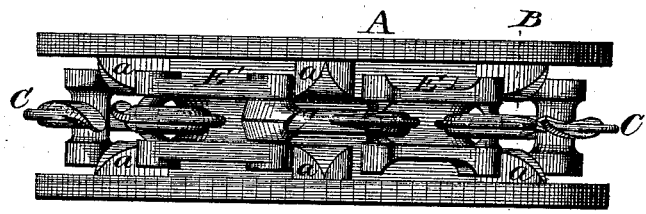
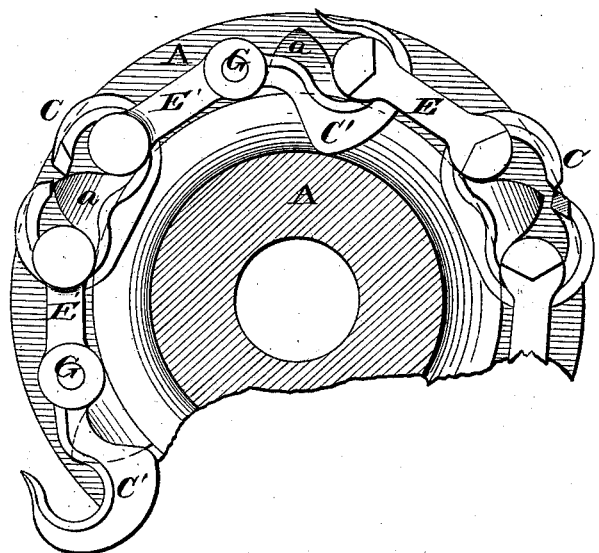
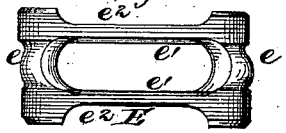
Witnesses.
Franck L. Ouraud
John G. Center
Inventor:
John D. Otstot
by A. M. Smith
Attorney.

UNITED STATES PATENT OFFICE.

JOHN D. OTSTOT, OF SPRINGFIELD, OHIO.

IMPROVEMENT IN DRIVING CHAINS AND PULLEYS.

Specification forming part of Letters Patent No. 201,698, dated March 26, 1878; application filed February 18, 1878.

*To all whom it may concern:*

Be it known that I, JOHN D. OTSTOT, of Springfield, county of Clarke, State of Ohio, have made certain new and useful Improvements in Driving Chains and Pulleys or Sprocket-Wheels, of which the following is a full, clear, and exact description, reference being had to the accompanying drawings, making part of this specification, in which—

Figure 1 is a plan or edge view of the wheel with the driving-chain applied. Fig. 2 is a sectional view through the sprocket-wheel, showing the manner in which the chain engages with the sprockets on the wheel. Figs. 3 and 4 are plan views of the connecting-hooks of the chain, and Fig. 5 is a plan view of one of the links.

Similar letters of reference denote corresponding parts wherever used.

The invention consists in the combination, with a working-link having squared ends or shoulders, of connecting-hooks having an oblique opening in one of the side bars for connecting said links, and adapting the links and hooks to be readily disconnected.

The invention further consists in providing the sprocket-wheel with squared or rectangular teeth, adapting it to operate upon opposite sides of the squared link, in line with its parallel side bars, for giving it increased bearing-surface, and preventing wedging action upon the links of the chain.

In the accompanying drawings, A is the sprocket-wheel, which, instead of being provided with the central spur or cog usually employed, is provided with spurs $a\ a$ upon each side of the center, forming a groove, B, between them, in which the hook of the chain runs.

The faces of the spurs or cogs $a\ a$, which act upon the driving-chain, are formed at right angles to the groove between them and to the side walls or cheeks of the sprocket-wheel, giving a squared or rectangular form to the teeth, instead of the oblique or tapering form usually employed, said form, in connection with the form of the working-link hereinafter described, giving greater bearing-surface to the link and greatly-increased durability to the wheel and chain, and obviating all wedging action on the links.

C C are the connecting-hooks, (shown detached in Figs. 3 and 4,) formed each of a single piece, and provided with an opening, $d$, through which the link is inserted for connecting it with the hook. The hook being made malleable, the opening can be closed, as shown in Fig. 4, after the link has been inserted for preventing it from being accidentally disconnected.

E are the links, composed of the end bars $e\ e$ and side bars $e^1\ e^1$, made in a single piece, the end bars being at right angles on their outer faces to the side bars, and forming squared ends for the teeth of the sprocket-wheel to act against. The side bars $e^1\ e^1$ are cut away, as shown at $e^2$, at points where the least strain comes, for the purpose of making them as light as practicable, and at the same time adapting them to be coupled with the hook-links with less opening of the hook or separation of its arms.

A modification in the form of the link and hook is shown at C' E', in which instance the hook is connected to the link by means of a pin. The link, in this instance, is formed with an open end, in which the enlarged end of the hook C' is placed, a pin, G, passing through a perforation formed in the ends of said link, and through a perforation in the enlarged end of hook C'.

By forming the link with the squared ends, as described, a larger bearing-surface is provided for the chain upon the spurs or cogs on the pulley, which admits of a greater amount of wear upon the chain.

By this construction, also, in connection with the form of the teeth of the sprocket-wheel, the resistance of the link to the action of the wheel, and vice versa, is brought into line with the parallel side bars of the links, greatly reducing the strain upon and the tendency to stretch the links of the chain, and the wedging action incident to the use of the bevel-teeth and rounded link is avoided.

Having now described my invention, what I claim as new, and desire to secure by Letters Patent, is—

1. The links E, provided with the squared ends, in combination with the intermediate connecting-links or double hooks C, having the oblique opening in one of its side bars, substantially as and for the purpose described.

2. The sprocket-wheel A, having its teeth or sprockets arranged on opposite sides of a central groove, with their working-faces at right angles to the groove, and parallel with the axis of the wheel, whereby wedging action on the links of the driving-chain is avoided, as described.

3. The combination of the sprocket-wheel, having the working-faces of its teeth at right angles to the central groove, and parallel with the axis of the wheel, and the chain having the rectangular actuating-links E, as described, whereby the strain of the teeth upon the link is brought directly into line with the parallel side bars of said link, as described.

JOHN D. OTSTOT.

Witnesses:
E. G. DIAL,
GEO. A. BARNES.